W. W. SCOTT.
HORN BLOWING ATTACHMENT FOR AUTOMOBILES.
APPLICATION FILED JUNE 3, 1914.
1,138,801.
Patented May 11, 1915.
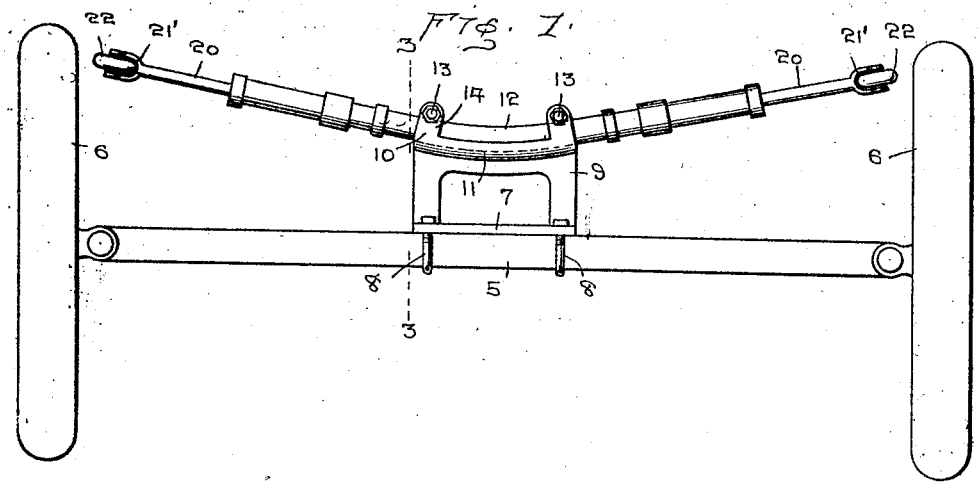
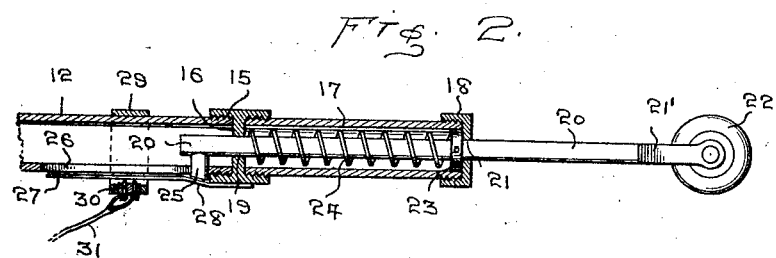
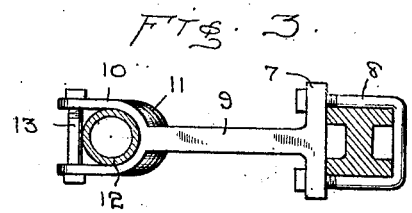
WITNESSES
W. W. Scott
INVENTOR
Attorneys

UNITED STATES PATENT OFFICE.

WILLIAM W. SCOTT, OF PLANT CITY, FLORIDA.

HORN-BLOWING ATTACHMENT FOR AUTOMOBILES.

1,138,801.   Specification of Letters Patent.   Patented May 11, 1915.

Application filed June 3, 1914. Serial No. 842,553.

*To all whom it may concern:*

Be it known that I, WILLIAM W. SCOTT, a citizen of the United States, residing at Plant City, in the county of Hillsboro and State of Florida, have invented certain new and useful Improvements in Horn-Blowing Attachments for Automobiles; and I do hereby declare the following to be a full, clear, and exact description of the invention, such as will enable others skilled in the art to which it appertains to make and use the same.

This invention relates to new and useful improvements in automatic signaling devices and has particular reference to devices of such character as are adapted to be attached to the axle of an automobile and to sound the horn when the automobile is rounding a curve.

As a particular object this invention contemplates the provision of an appliance of the above described character which shall be readily attached to or detached from the axle of a vehicle and which will instantaneously and automatically sound the horn when the machine is rounding a curve.

A further object is the provision of a device which will permit of slight movements from a straight path of travel as often becomes necessary in avoiding stones, ruts, etc., without necessarily sounding the alarm.

An object of equal importance with the foregoing is to provide an automatic signaling device of the type described which is constructed with such regard to proper number and arrangement of parts as to be cheaply manufactured, will be durable and efficient in operation and may readily be applied to the axle of any automobile with a minimum expenditure of time and labor and without requiring any alteration in the construction of the latter.

The above and additional objects are embodied by such means as are illustrated in the accompanying drawings, described in the following specification and more particularly pointed out in the claims which are appended hereto to form a part of this application.

Before taking up the description of the drawing, I desire to emphasize the fact that while my invention has been designed as a particular reference to the needs of automobiles, has been illustrated and will hereinafter be described in that connection, it may, nevertheless, be applied with equal efficiency to a street railway car or any other type of moving vehicle.

In reference to the drawings wherein I have described the preferred embodiment of my invention as it is reduced to practice and throughout the several views of which like characters of reference designate similar parts, Figure 1 is a top plan view of the forward axle of an automobile showing my device applied thereto. Fig. 2 is a longitudinal section through a portion of the mechanism of my invention, and Fig. 3 is a sectional view taken on the plane indicated by the line 3—3 of Fig. 1.

Referring now to the drawings and more particularly to Figs. 1 and 3, the numeral 5 indicates the front axle of an automobile of the usual construction and provided with the pivoted wheels 6. The body member 7 of my improved device is secured to the axle 5 and in the center thereof by means of the U bolts 8 and is provided with the integral frame member 9 at the rearward extremity of which is formed the integral U-shaped retaining member 10. This U-shaped member 10 is arcuately curved as shown at 11 and is adapted to receive a similarly curved tube 12, which is held in place therein by means of bolts 13 and which extends toward the wheels of the vehicle in both directions from the frame 9 and is externally screw threaded for a short distance upon each of its extremities. The internally screw threaded sleeve 15 which is provided with the inner partition 16 connects this tube 12 with a similar tube 17 which however, is much shorter in length. Both extremities of these tubes 17 are externally screw threaded and the outer ends are closed with the apertured sleeve caps 18. The partition 16 of the sleeve 15 is apertured in its center as shown at 19 to form a bearing for the piston 20 which is slidably positioned within the tube 17 and extends through the aperture 21 of the sleeve cap 18. The outer end of this piston 20 is bifurcated as shown at 21', the ends of the bifurcation being journaled to receive the small rotatable wheel 22 which extends in spaced relation from the large wheel 6 of the automobile.

A collar 23 is fixed to the piston 20 and adapted to slide upon the inside of the tube 17. The expansive spring 24 is also positioned within the tube 17 and encircles the piston 20 in such manner as to bear against the fixed collar 23 at one extremity and against the inner partition 16 of the sleeve 15 on the other extremity. It will thus be seen that this spring 24 tends to force the fixed collar 23 outwardly against the sleeve cap 18 and accordingly normally holds the piston 20 in the position shown in Fig. 2. The inward end of the piston 20 carries the downwardly extending lug 25 which works in a suitable slot 26 formed in the lower wall of the tube 12.

A flat elongated lever spring 27 extends throughout the length of the tube 12 and is so positioned underneath said tube as to pass directly under the slot 26 in which the lug 25 is adapted to move. In the normal position of the device as shown in Fig. 2 this spring 27, which is bent as shown at 28 adjacent its outward extremity, avoids contact with the lug 25, but is adapted to be actuated in other normal positions of the piston 20 in a manner to be hereinafter more fully described. A sleeve 29 is carried by the tube 12 in such manner as to encircle the leaf spring 27 and carries in its lower portion the elongated contacts 30 which are suitably connected by means of the wire 31 to the electric horn of the automobile and which are normally kept from contact with the spring 27.

The operation of the spring 27 of my invention is very simple and entirely automatic as will be seen by a glance at Fig. 1. When the machine is so directed as to make a curve, deviating from a previous straight path of travel, one of the wheels 6, in swinging inwardly, will contact with the rotatable wheel 22 and will force the piston 20 inwardly against the action of the expanding spring 24. This inward movement of the piston 20 will force the lug 25 against the leaf spring 27 which will in turn be accordingly displaced outward from the tube 12 and into contact with the electrical connections 30 which will complete a circuit and cause the horn to sound continuously until the device is automatically released by the machine assuming a path of travel, such as will bring the wheel 6 once more at right angles to the axle 5. When this takes place it will be evident that the piston 20 will be forced back to its normal position as before described by the spring 24 and the pressure of the lug 25, being removed from the leaf spring 27, will enable that spring to once more assume the position shown in Fig. 2 and accordingly break the connection with the electrical contacts 30 and thus cease the sounding of the horn.

It will be obvious in this connection that I may desire to employ an attachment of obvious construction, which will enable the horn to be sounded on the straightaway, either by placing the spring 27 against the contacts 30 by some other means than the piston 20, or else by separate appliances altogether. The provision of such an attachment however, will not in any way effect the use or operation of this invention.

While in the foregoing I have illustrated in the drawings and described in the specification such combination and arrangement of elements as constitute the preferred embodiment of my invention, I desire to emphasize the fact that I may make such minor changes in the matter of proportion and degree in later adaptations of my device, as shall not alter the spirit of my invention as defined in the appended claims.

What I claim is:—

1. In an automatic signaling device, a frame, means for removably attaching said frame to the axle of a vehicle, a tube removably carried by said frame and means carried by said tube and designed to be automatically actuated by the wheel attached to said axle to operate a signal when the vehicle is rounding the curve.

2. In an automatic signaling device, a frame, means for removably attaching said frame to the axle of a vehicle, a tube removably carried by said frame, a piston slidably positioned within said tube, means carried at one extremity of said piston adapted to contact with the wheels of a vehicle when rounding a curve and means at the other extremity of said piston for completing a circuit necessary to operate a signal when said wheels contact with said first means.

3. In an automatic signaling device, a frame, means for removably attaching said frame to the axle of a vehicle, a tube removably carried by said frame, pistons slidably positioned within said tube, means carried on the outer extremity of said pistons for contacting with the wheels of a vehicle, means carried on the inward extremity of said pistons and adapted to complete an electric circuit when said pistons are forced inwardly by the contact of said wheels with first said means and resilient means connected to said pistons whereby the same are returned to their normal position when such contact ceases.

4. The combination with an axle of a vehicle having wheels pivoted at the extremity thereof, of a frame removably secured to said axle, a tube removably carried by said frame and slidable means carried by said tube adapted to contact with one or other of said wheels when the machine is rounding a curve to complete an electric circuit necessary for the operation of a signal.

5. In an automatic signaling device, a frame, means for attaching said frame to the axle of a vehicle, a tube carried by said frame, a piston slidably mounted within said tube, means at one end of said piston adapted to contact with the wheels of the vehicle, and means at the other end of said piston for completing a circuit to operate a signal when the said wheels contact with said first means.

In testimony whereof I have signed my name to this specification in the presence of two subscribing witnesses.

WILLIAM W. SCOTT.

Witnesses:
H. B. CALLAGHAN,
PETER BERNARD.